United States Patent
Akaiwa et al.

(10) Patent No.: US 11,323,671 B2
(45) Date of Patent: May 3, 2022

(54) PROJECTION DISPLAY APPARATUS AND METHOD OF CONTROLLING THE SAME

(71) Applicant: Panasonic Intellectual Property Management Co., Ltd., Osaka (JP)

(72) Inventors: Natsumi Akaiwa, Osaka (JP); Nao Morishita, Osaka (JP); Teruto Tanaka, Osaka (JP); Kyousuke Nishihata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/159,597

(22) Filed: Jan. 27, 2021

(65) Prior Publication Data

US 2021/0243414 A1  Aug. 5, 2021

(30) Foreign Application Priority Data

Jan. 30, 2020 (JP) .............................. JP2020-013527

(51) Int. Cl.
*H04N 9/31* (2006.01)
*G03B 21/53* (2006.01)

(52) U.S. Cl.
CPC ............. *H04N 9/317* (2013.01); *G03B 21/53* (2013.01); *H04N 9/3155* (2013.01)

(58) Field of Classification Search
CPC ........ H04N 9/317; H04N 9/31; H04N 9/3155; H04N 9/28; G03B 21/53; G03B 3/00
USPC ........... 348/739, 744, 745, 806; 353/76, 101
See application file for complete search history.

(56) References Cited

U.S. PATENT DOCUMENTS

| 2005/0242741 | A1  | 11/2005 | Shiota et al. |
| 2011/0019109 | A1* | 1/2011  | Maeda ................... H04N 9/317 |
| | | | 348/745 |

FOREIGN PATENT DOCUMENTS

| JP | 2009-223111 | 10/2009 |
| JP | 2011-76029  | 4/2011 |
| JP | 2014-232167 | 12/2014 |
| JP | 2015-102571 | 6/2015 |
| WO | 2005/009035 | 1/2005 |

* cited by examiner

*Primary Examiner* — Sherrie Hsia
(74) *Attorney, Agent, or Firm* — Wenderoth, Lind & Ponack, L.L.P.

(57) ABSTRACT

A projection display apparatus for projecting and displaying image light onto a projection plane includes an image light generator that generates the image light, a projection optical system including a projection lens that projects the image light onto the projection plane, a focus controller that controls focusing of the projection lens, and a temperature sensor that detects a temperature of the projection display apparatus. The focus controller operates to, calculate a plurality of focus deviation amounts which correspond respectively to a plurality of component groups based on first information obtained from the image light generator and second information obtained from the temperature sensor, the plurality of component groups being classified depending on kinds of components constructing the projection optical system, calculate a focus correction amount according to the plurality of focus deviation amounts calculated, and control the focusing based on the focus correction amount calculated.

7 Claims, 6 Drawing Sheets

FIG. 2

Focus correction amount table for component group A

| Change in the output image light intensity | Maximum correction amount (μm) | Time necessary for change (sec) |
|---|---|---|
| 0%→50% | -50 | 150 |
| 100%→50% | 50 | 120 |

FIG. 3

Focus correction amount table for component group B

| Change in the output image light intensity | Maximum correction amount (μm) | Time necessary for change (sec) |
|---|---|---|
| 0%→50% | 20 | 2000 |
| 100%→50% | -20 | 1500 |

FIG. 4

Focus correction amount table for component group A and B

| Component group | Correction amount (μm) | | | | |
|---|---|---|---|---|---|
| | 0~10°C | 10~20°C | 20~30°C | 30~40°C | 40~50°C |
| A | 2 | 5 | 7 | 8 | 8 |
| B | 5 | 12 | 17 | 19 | 20 |

PROJECTION DISPLAY APPARATUS AND METHOD OF CONTROLLING THE SAME

BACKGROUND

1. Technical Field

The present disclosure relates to a projection display apparatus such, for example, as a projector, and a method of controlling the projection display apparatus.

2. Description of the Related Art

A conventional projector and a method of controlling the projector are disclosed, for example, in Patent Literature (PTL) 1. This conventional projector is capable of easily suppressing irregularity in a focus state caused by thermal expansion of a projection optical system and its peripheral members.

In the conventional projector, the rise of the internal temperature of the projector after turning on the light source device causes thermal expansion of the projection lens and its peripheral members, so that a focus deviation is generated to cause blurs of the projected image. In other words, a focus state having been adjusted by a user is disturbed. To solve the problem of focus deviation associated with the temperature rise, the projector has a focus correction function for correcting the focus condition according to the temperature of the projection lens. To perform a correction using the focus correction function, a correction amount depending on the lens temperature is obtained by referring to a correction table which contains lens temperatures and correction amounts corresponding to the lens temperatures.

PTL 1 is Unexamined Japanese Patent Publication No. 2011-076029.

SUMMARY

However, as a problem having been emerging in association with the progress of higher luminance projectors, the conventional projectors are not capable of correcting the focus deviation generated immediately after turning on the light source.

An object of the present disclosure is to provide a projection display apparatus that is capable of correcting the focus deviation generated immediately after turning on the light source, and a method of controlling the projection display apparatus.

The present disclosure in a first aspect provides a projection display apparatus for projecting and displaying image light onto a projection plane. The projection display apparatus includes, an image light generator that generates the image light by modulating light emitted from a light source according to an input image signal, a projection optical system including a projection lens that projects the image light onto the projection plane so that the image is magnified, a focus controller that controls focusing of the projection lens, and a temperature sensor that detects a temperature of the projection display apparatus. The focus controller operates to, calculate a plurality of focus deviation amounts which correspond respectively to a plurality of component groups based on first information obtained from the image light generator and second information obtained from the temperature sensor, the plurality of component groups being classified depending on kinds of components constructing the projection optical system, calculate a focus correction amount according to the plurality of focus deviation amounts having been calculated, and control the focusing based on the focus correction amount having been calculated.

The present disclosure in a second aspect provides a method of controlling focusing of a projection display apparatus, the method includes the steps of, obtaining first information from an image light generator that generates image light by modulating light emitted from a light source according to an input image signal, obtaining second information from a temperature sensor that detects a temperature of the projection display apparatus, calculating a plurality of focus deviation amounts which correspond respectively to a plurality of component groups based on the first information and the second information, the plurality of component groups being classified depending on kinds of components constructing a projection optical system of the projection display apparatus, and calculating a focus correction amount according to the plurality of focus deviation amounts having been calculated and controlling the focusing based on the focus correction amount having been calculated.

According to the projection display apparatus of the present disclosure and the method of controlling the same, focusing is controlled for each of the plurality of component groups which are classified depending on the kinds of the components constructing the projection optical system. Accordingly, it is possible to properly correct the focus deviation so that the focus deviation is minimized after turning on or turning off the light source.

BRIEF DESCRIPTION OF DRAWINGS

FIG. 2 is a table showing a first example of a focus correction amount table stored in correction amount table memory 36 shown in FIG. 1.

FIG. 3 is a table showing a second example of the focus correction amount table stored in correction amount table memory 36 shown in FIG. 1.

FIG. 4 is a table showing a third example of the focus correction amount table stored in correction amount table memory 36 shown in FIG. 1.

DETAILED DESCRIPTION

Figure 1:
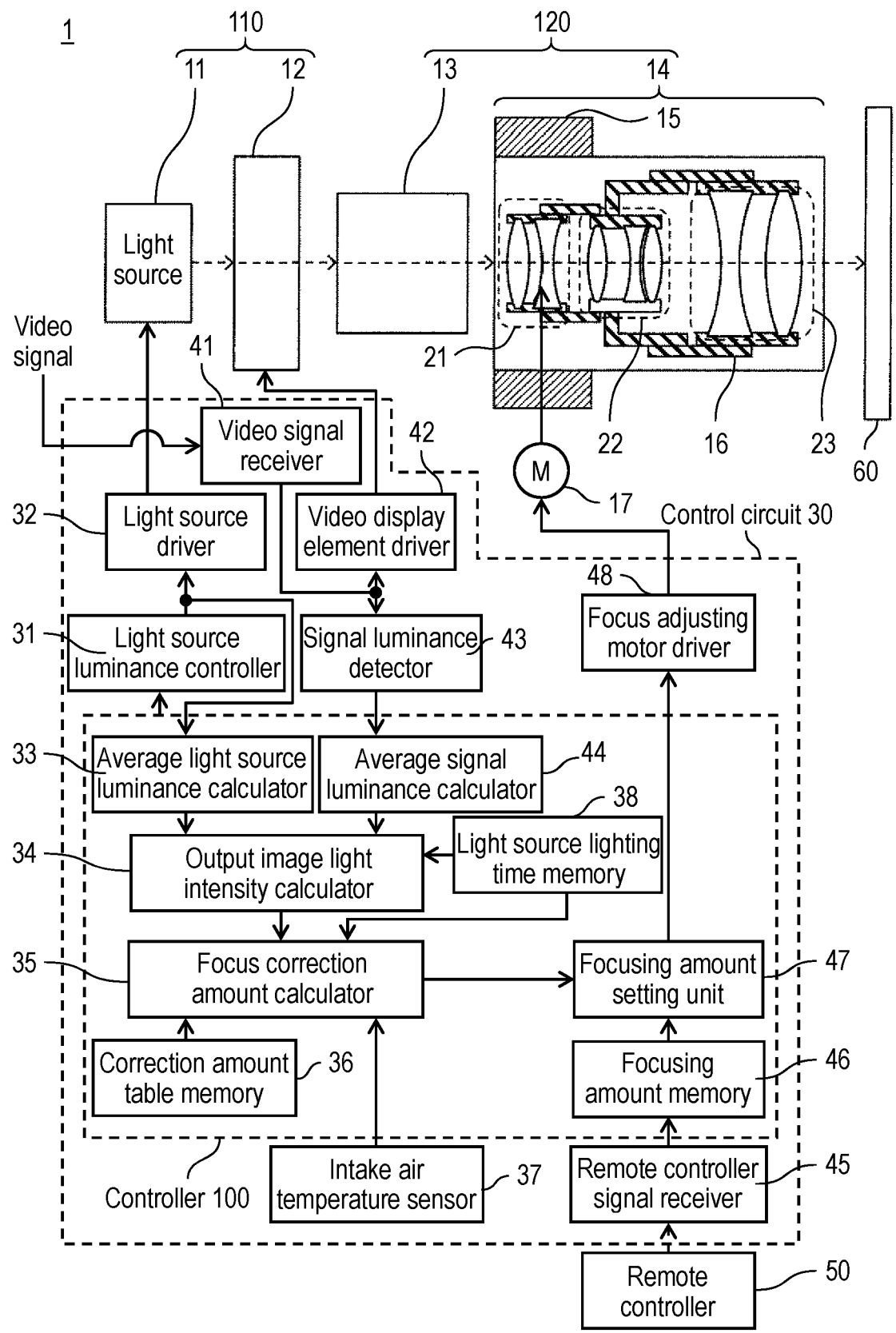
FIG. 1 is a block diagram showing an example configuration of projector 1 which is an example of the projection display apparatus in accordance with an exemplary embodiment.

Hereinafter, an exemplary embodiment will be described with reference to the accompanying drawings as appropriate. However, unnecessarily detailed description may occasionally be omitted. For example, detailed description of well-known matters and redundant description of substantially the same configuration may occasionally be omitted. These omissions are made to avoid the following description from becoming unnecessarily redundant, and to help any person skilled in the art to easily understand the description.

Also, it should be noted that the inventors provide the following description and the accompanying drawings to help any person skilled in the art to fully understand the present disclosure, and do not intend to limit the subject matter described in the claims by the following description and the accompanying drawings.

(Inventor's Knowledges)

As development of higher luminance projectors has been progressing, the focus deviation immediately after turning on the light source has emerged as a problem to be solved. The focus deviation is caused by the thermal deformation of the lenses and the lens barrel components, which construct the projection lens, and the change in the focal distance caused due to the temperature dependency of the refractive index of the projection lens. In relation to this problem, such a projector is known that is, as described above, equipped with the function of correcting the focus deviation amount caused in association with the lighting of the light source according to the temperature of the projection lens and the environmental temperature (see, for example, PTL 1).

The inventors focused attention on the fact that the projection lens includes components which cause a change in the focal distance within a short time (within several minutes) in response to the change in the intensity of the entering light, and components which spend a long time (several tens of minutes) to cause a change in the focal distance in response to the change in the intensity of the entering light. Here, what is actually observed as the focus deviation is a phenomenon appearing as a result that the focus deviations caused by the above-described two main factors are synthesized, as will be described later with reference to FIGS. 5 to 7. Also, the amount of the focus deviation is continuously changing due to various causes including the turn-on of the light source, changeovers of the video signal, and changes in the environmental temperature. Since it was difficult to effectively correct the changing amounts of the above-described two kinds of focus deviations, it was difficult to constantly obtain sharp images.

To solve the above-described problem, the inventors provide a solution including the steps of: referring to the intensity of the light entering the projection lens and the environmental temperature at intervals, for example, of several seconds; obtaining amounts of the focus deviations caused by the respective components which spend different times from each other to cause changes of the focal distance; and synthesizing the obtained amounts of focus deviations. Calculating, in this manner, the amounts of focus deviations at intervals, for example, of several seconds based on the change in the intensity of the entering light and the change in the environmental temperature, allows it possible to correct in real time the focus deviations caused due to the factors including, for example, the turn-on of the light source and changeovers of the video signal to constantly obtain sharp images.

Exemplary Embodiment

Hereinafter, an exemplary embodiment based on the above-described knowledges will be described with reference to FIGS. 1 to 8.

FIG. 1 is a block diagram showing an example configuration of projector 1 which is an example of the projection display apparatus in accordance with an exemplary embodiment.

Referring to FIG. 1, projector 1 may comprise image light generator 110, projection optical system 120, focus adjusting motor 17, and control circuit 30. Image light generator 110 may comprise light source 11, and video display element 12. Projection optical system 120 may comprise prism 13, and projection lens 14. Projection lens 14 may comprise projection lens holder 15, lens barrel component group 16, and first, second and third lens groups 21, 22 and 23.

Light source 11 may be configured by a solid-state light source such, for example, as a semiconductor laser diode, or a metal halide lamp or the like. Illuminating light such, for example, as white light emitted from light source 11 is directed through video display element 12 to prism 13. Video display element 12 may, for example, be a digital micromirror device (DMD) and modulates the illuminating light according to a drive signal outputted from video display element driver 42 to generate image light. In other words, image light generator 110 comprising light source 11 and video display element 12 generates the image light. Prism 13 deflects the entered image light by a specific angle and outputs the deflected image light to projection lens 14. Projection lens 14 projects the entered image light onto screen 60, which is an example of the projection plane, such that a magnified image is displayed on screen 60.

Projection lens 14 is configured to include first, second and third lens groups 21, 22 and 23. Each of first, second and third lens groups 21, 22 and 23 may be configured to include a single lens or a plurality of lenses. Projection lens 14 is held by projection lens holder 15. In projection lens 14, first, second and third lens groups 21, 22 and 23 are mounted in a lens barrel constructed by lens barrel component group 16. One or more lenses included in projection lens 14 may be moved, for example, in an optical axis direction to adjust focus of the image formed by the image light projected onto screen 60. The movement of the one or more lenses in the optical axis direction is performed by focus adjusting motor 17. Focus adjusting motor 17 is driven by a drive signal outputted from focus adjusting motor driver 48 which will be described later. Although it may not be applied only to the present exemplary embodiment, the entire projection lens 14 may be moved in the optical axis direction to adjust the focus of the image formed by the image light projected onto screen 60.

Control circuit 30 may comprise controller 100 (an example of the focus controller) that mainly performs a focus control, light source luminance controller 31, light source driver 32, video signal receiver 41, video display element driver 42, signal luminance detector 43, focus adjusting motor driver 48, and remote controller signal receiver 45. Since remote controller signal receiver 45 may have a function of receiving a control signal, the method of transmitting the control signal may not be limited to a wireless transmission. For example, the transmitting method may be a wired transmission using a cable connected so that the control signal is received through the cable from a personal computer (PC).

Controller 100 may be implemented, for example, by a field-programmable gate array (FPGA) and may comprise a central processing unit (CPU), a random access memory (RAM) that stores various kinds of data, and a read only memory (ROM) that stores control programs and the like. Controller 100 may be configured, as a functional structure, to comprise average light source luminance calculator 33, output image light intensity calculator 34, focus correction amount calculator 35, correction amount table memory 36, light source lighting time memory 38, average signal luminance calculator 44, remote controller signal receiver 45, focusing amount memory 46, and focusing amount setting unit 47.

Light source luminance controller 31 performs its control operation under control by controller 100. Light source luminance controller 31 controls light source driver 32 so that light source 11 emits light of a specified light intensity. Here, light source driver 32 generates a drive signal for this control and outputs the drive signal to light source 11 to drive light source 11. The drive signal is also outputted to average light source luminance calculator 33.

An input video signal (an example of the image signal) applied to projector 1 is inputted to and received by video signal receiver 41 which has, for example, a buffer memory. Video signal receiver 41 outputs the received video signal to video display element driver 42 and signal luminance detector 43. Video display element driver 42 generates a drive signal for driving video display element 12 based on the video signal and outputs the drive signal to video display element 12. The drive signal causes video display element 12 to modulate the light emitted from light source 11 to generate the image light. Signal luminance detector 43 detects the luminance signal of the video signal and outputs the detected luminance signal to average signal luminance calculator 44.

Average signal luminance calculator 44 calculates an average signal luminance which is an average value of the luminance signal in, for example, each frame of the video signal, and outputs the calculated average signal luminance to output image light intensity calculator 34. Also, based on the drive signal from light source luminance controller 31, average light source luminance calculator 33 calculates an average light source luminance, which is an average value of luminance of the illuminating light emitted from light source 11 in, for example, each frame, and outputs the calculated average light source luminance to output image light intensity calculator 34. Light source lighting time memory 38 is connected to output image light intensity calculator 34. Output image light intensity calculator 34 calculates an output image light intensity of the entire image light projected from projection lens 14 (corresponding to the light intensity of the image light) based on 1) a light source lighting time which indicates the degree of degradation of light source 11 (an example of degradation information) and is stored in light source lighting time memory 38 and 2) the inputted average light source luminance and average signal luminance (corresponding to an ideal light intensity). Output image light intensity calculator 34 outputs the calculated output image light intensity to focus correction amount calculator 35.

Intake air temperature sensor 37 (an example of the temperature sensor) and light source lighting time memory 38 are connected to focus correction amount calculator 35. Intake air temperature sensor 37, which is disposed, for example, near an air cooling fan of projector 1 inside the housing of projector 1, measures (detects) the temperature of the taken-in external air and outputs the measurement result to focus correction amount calculator 35. Intake air temperature sensor 37 is a means that measures a temperature inside the housing, or an inner temperature such as, particularly a temperature around projection lens 14 (the temperature of projector 1, and will hereinafter be referred to as an environmental temperature). The means for acquiring the environmental temperature is not limited to intake air temperature sensor 37, and a method of acquiring the temperature inside the housing, particularly the temperature sensor attached inside projection lens 14 may be used. Light source lighting time memory 38 stores a light source lighting time, which is an accumulated lighting time of light source 11 counted by controller 100, and outputs the stored data to focus correction amount calculator 35. The light source lighting time is a data indicating an example of the degree of degradation of light source 11.

Correction amount table memory 36 (an example of a storage unit storing a focus correction amount table) is also connected to focus correction amount calculator 35. As will be described later with reference to FIGS. 5 to 7, correction amount table memory 36 stores a focus correction amount table (refer to FIGS. 2 to 4, which will be described later) which contains a focus deviation amount (a correction amount) corresponding to the environmental temperature (corresponding to the second information) and a focus deviation amount corresponding to the output image light intensity (corresponding to the first information) for each of the component groups of projection lens 14. The component groups include, for example:
1) a group including second lens group 22, which has such a focus deviation amount characteristic that causes the focus deviation amount to become substantially constant in a relatively short time after a turn-on of light source 11 (hereinafter referred to as component group A); and
2) a group including first and third lens groups 21 and 23 and lens barrel component group 16, which has such a focus deviation amount characteristic that causes the focus deviation amount to become substantially constant in a relatively long time than second lens group 22 after a turn-on of light source 11 (hereinafter referred to as component group B).

Focus correction amount calculator 35 refers to the focus correction amount table based on the environmental temperature and the output image light intensity and calculates a focus correction target value for each of the component groups using, for example, a specified calculation formula (with, for example, different coefficients for different component groups; a table may be used in place of the calculation formula). Then, focus correction amount calculator 35 calculates a focus deviation amount from a difference between a current focus correction amount and the focus correction target value for each of the component groups. Then, focus correction amount calculator 35 adds the focus deviation amounts calculated for the respective component groups to obtain a focus correction amount for the entire projection optical system 120 and outputs the obtained focus correction amount to focusing amount setting unit 47.

A user uses remote controller 50 to enter an adjusting instruction related to focusing of the image formed on screen 60 by the image light projected onto screen 60. A signal containing data related to the focus adjusting instruction (the focusing amount) is transmitted by, for example, an infrared communication system to remote controller signal receiver 45. Remote controller signal receiver 45 receives this signal and stores the data related to the focus adjusting instruction in focusing amount memory 46. Focusing amount setting unit 47 corrects the focusing amount indicated by the data stored in focusing amount memory 46 according to the focus correction amount having been calculated by focus correction amount calculator 35 to set a corrected focusing amount, and outputs the set focusing amount to focus adjusting motor driver 48. Focus adjusting motor driver 48 generates a drive signal based on the input set value of focusing amount to drive focus adjusting motor 17.

FIGS. 2 to 4 are tables showing examples of the focus correction amount table stored in correction amount table memory 36 shown in FIG. 1.

The focus correction amount table shown in FIG. 2 is a focus correction amount table for the focus deviation caused by component group A with respect to the output image light intensity. This focus correction amount table stores, with respect a change in the output image light intensity, a maximum correction amount (a maximum value of the focus deviation amount), and a time necessary for the focus deviation amount to reach the maximum value.

The focus correction amount table shown in FIG. 3 is a focus correction amount table for the focus deviation caused by component group B with respect to the output image light intensity. This focus correction amount table stores, with respect to the change in the output image light intensity, a maximum correction amount (a maximum value of the focus deviation amount), and a time necessary for the focus deviation amount to reach the maximum value.

As apparent by comparing the focus correction amount table in FIG. 2 and the focus correction amount table in FIG. 3, it is necessary to correct the focus deviation caused by component group A in a shorter time compared to the focus deviation caused by component group B, in response to a change in the output image light intensity.

The focus correction amount table shown in FIG. 4 is a focus correction amount table for the focus deviation caused by both component group A and component group B with respect to the environmental temperature. Contents stored in this table are focus deviation amounts (the correction amounts) with respect to the environmental temperatures. Each of the correction amounts written in FIG. 4 represents a correction amount from a reference point. For example, in such a situation that the temperature measured by intake air temperature sensor 37 has changed from 27° C. to 32° C., the necessary correction amount from the reference point for component group A changes from 7 μm to 8 μm. Therefore, focus correction amount calculator 35 determines that correction of additional 1 μm is necessary for component group A. Similarly, focus correction amount calculator 35 determines that correction of additional 2 μm is necessary for component group B.

Figure 5:
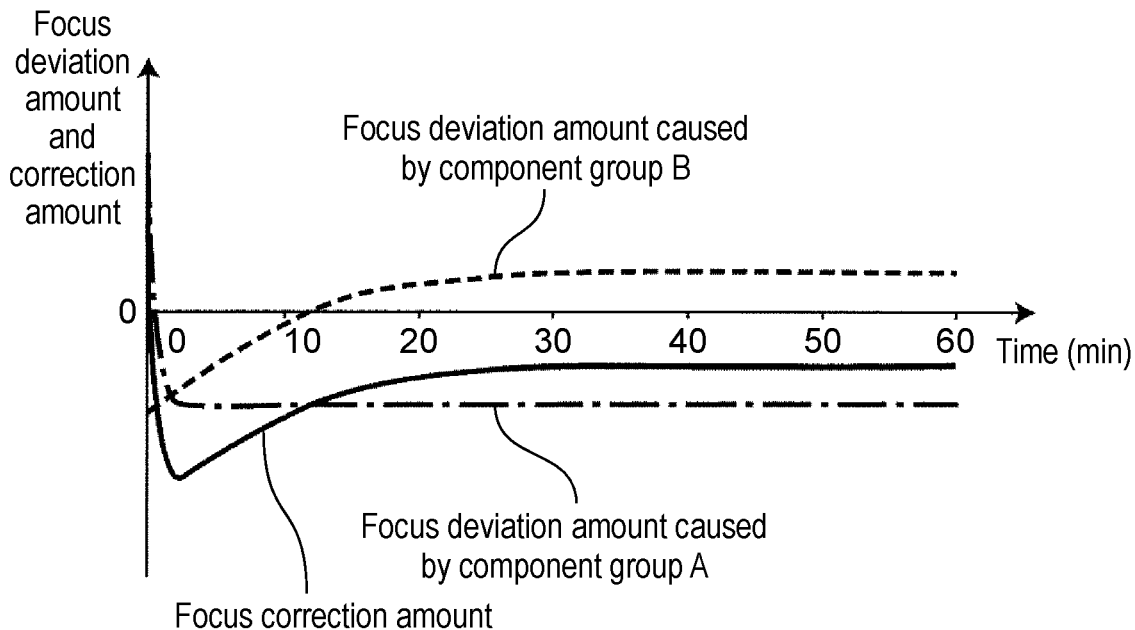
FIG. 5 is a graph showing a first example of focus deviation amounts caused by the respective component groups of projection lens 14 shown in FIG. 1.
Figure 6:
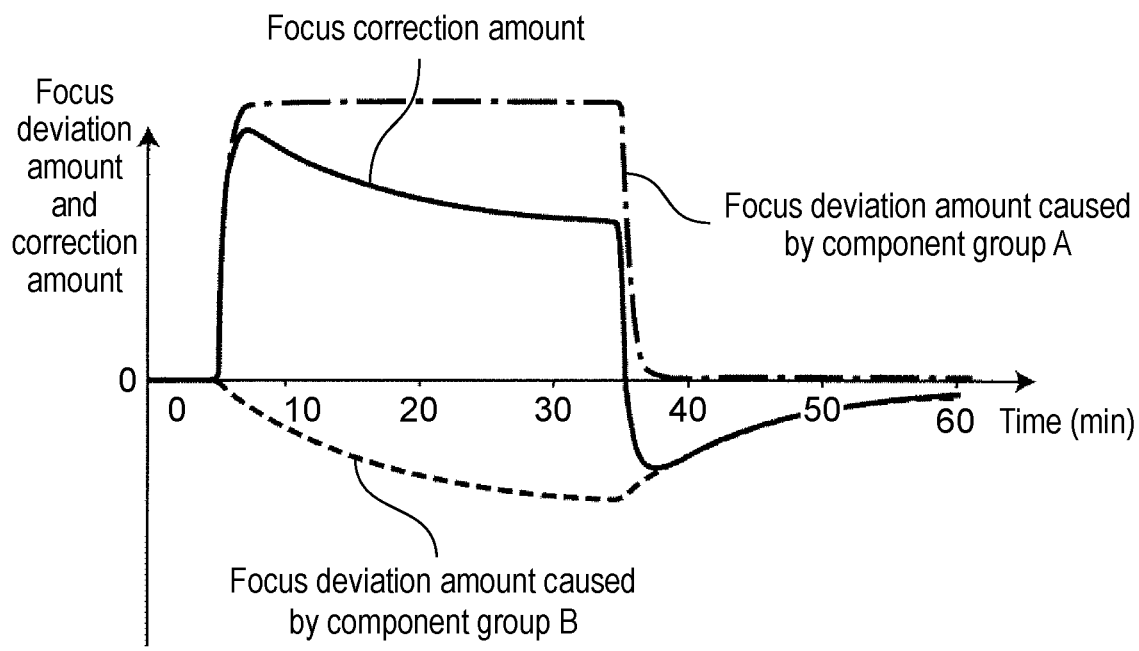
FIG. 6 is a graph showing a second example of focus deviation amounts caused by the respective component groups of projection lens 14 shown in FIG. 1.
Figure 7:
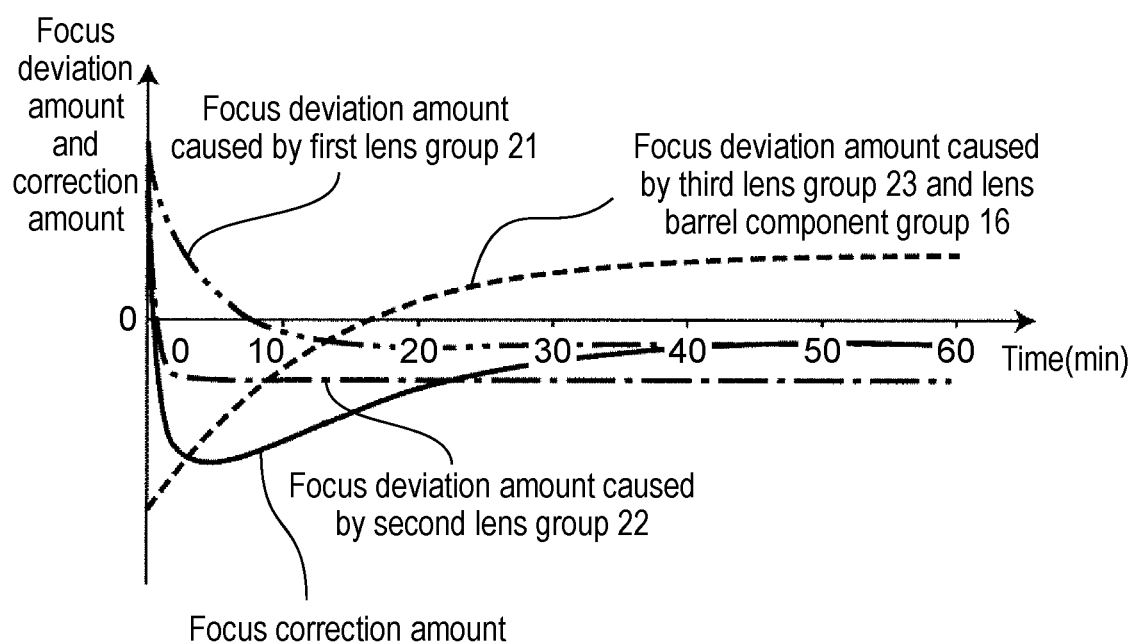
FIG. 7 is a graph showing a third example of focus deviation amounts caused by the respective component groups of projection lens 14 shown in FIG. 1.

FIGS. 5 to 7 are graphs showing examples of the focus deviation amounts caused by each of the component groups of projection lens 14 shown in FIG. 1. The reference point (zero point) of each of the focus deviation amount and the correction amount in each of FIGS. 5 to 7 is a position of the lens under a condition that the temperature measured by intake air temperature sensor 37 is 25° C. and the output image light intensity is 50% relative to the 100% intensity of the light emitted from light source 11.

FIG. 5 shows a case in which the respective focus deviations caused by component groups A and B can be distinguished from each other. FIG. 5 shows the respective focus deviation amounts caused by component groups A and B after light source 11 has been turned on under a condition that the output image light intensity is 70% relative to the 100% intensity of the light emitted from light source 11, and the focus correction amounts based on the focus deviation amounts. As clear from FIG. 5, the focus deviation amount caused by component group A changes quickly with the lapse of the projecting time and becomes substantially constant after about 2 minutes or so has passed. On the other hand, the focus deviation amount caused by component group B changes gradually over time and becomes substantially constant after about 40 minutes or so has passed.

FIG. 6 shows a case in which the respective focus deviations caused by component groups A and B can be distinguished from each other. FIG. 5 shows the respective focus deviation amounts caused by component groups A and B and the focus correction amounts based on the focus deviation amounts in a condition that a state in which the focus correction amount becomes substantially constant after light source 11 has been turned on is defined as a reference (0) and then light source 11 is turned off and kept in an extinguished state for a time period, for example, from 5 minutes to 35 minutes after the reference (0). As clear from FIG. 6, the focus deviation amount caused by component group A changes quickly to a large value in response to a turn-on or turn-off of light source 11, but, on the other hand, the focus deviation amount caused by component group B changes gradually in response to the turn-on or turn-off of light source 11.

FIG. 7 shows a case in which the respective focus deviations caused by the three component groups (first lens group 21, second lens group 22, and the group including third lens group 23 and lens barrel component group 16) can be distinguished from one another. FIG. 7 shows the respective focus deviation amounts caused by the three component groups after light source 11 has been turned on under a condition that the output image light intensity is 70% relative to the 100% intensity of the light emitted from light source 11, and the focus correction amounts based on the focus deviation amounts. As clear from FIG. 7, the focus deviation amount caused by the first lens group 21 changes gradually with the lapse of the projecting time to become substantially constant after about 20 minutes or so has passed, and the focus deviation amount caused by second lens group 22 changes quickly with the lapse of the projecting time to become substantially constant after about 2 minutes or so has passed. On the other hand, the focus deviation amount caused by third lens group 23 and lens barrel component group 16 changes gradually with the lapse of the projecting time in the opposite direction to the direction of the focus deviation caused by first lens group 21, and becomes substantially constant after about 50 minutes or so has passed.

As clear from FIGS. 5 to 7, the focus deviation amount has, with respect to the time passed after turning on or turning off light source 11, different changing characteristics dependent on component groups A and B or on the three component groups (first lens group 21, second lens group 22, and the group including third lens group 23 and lens barrel component group 16). Accordingly, the focus deviation amount with respect to the time passed after turning on or turning off light source 11 can be minimized by adjusting the focusing amount using the focus correction amounts shown in FIGS. 5 to 7. Although the components of projection optical system 120 can be classified to two or three component groups in the case of the above-described example, it is also possible to classify the components of the projection optical system to four or more component groups and calculate the focus correction amount for the entire projection optical system based on the respective focus deviation amounts caused by the classified component groups to perform the focus control.

Figure 8:
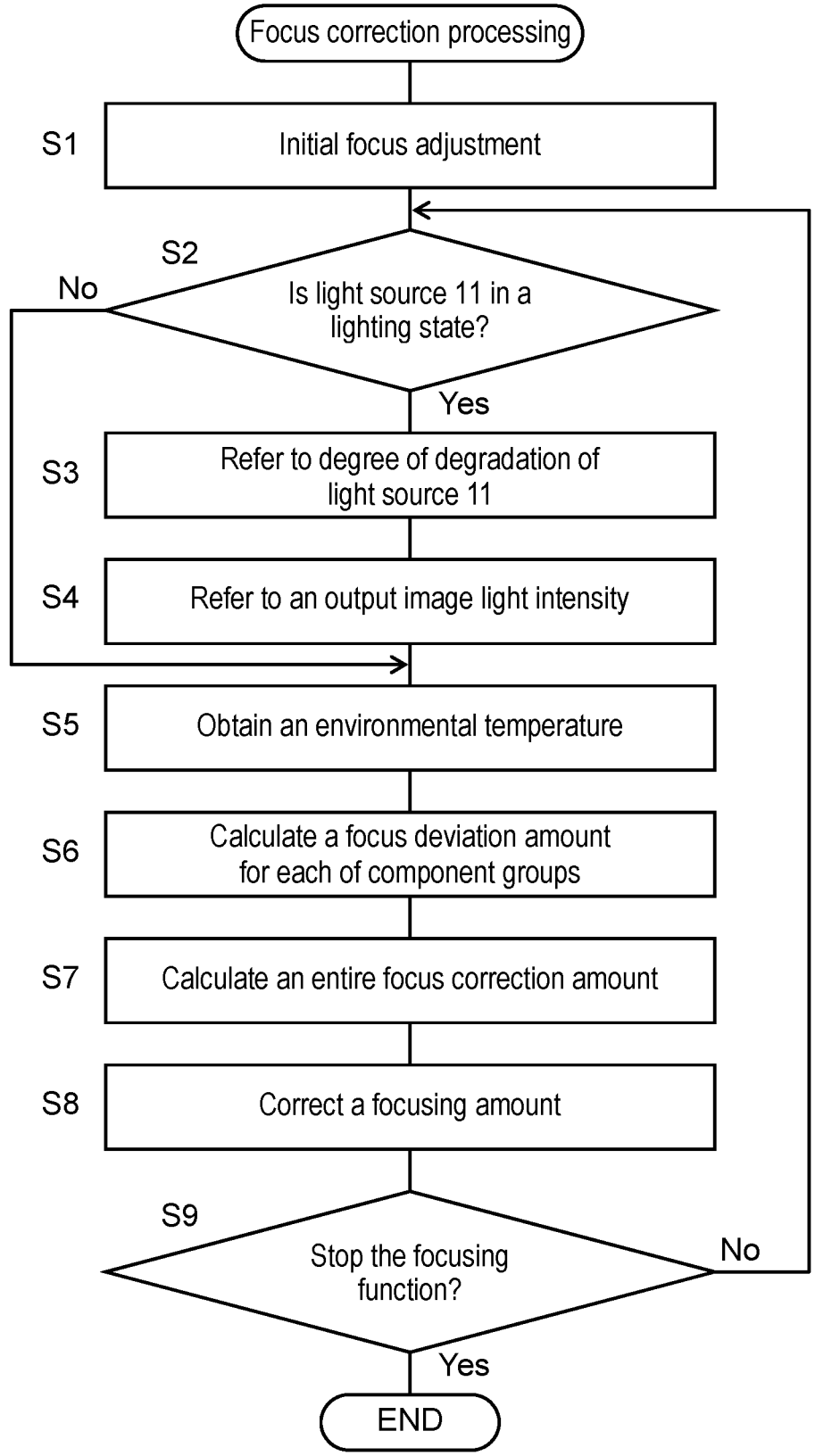
FIG. 8 is a flowchart showing a focus correction processing executed by controller 100 shown in FIG. 1.

FIG. 8 is a flowchart showing a focus correction processing executed by controller 100 shown in FIG. 1.

In step S1 in FIG. 8, the user powers on projector 1 to cause light source 11 of projector 1 to light and the functions of projector 1 to start, and then performs an initial focus adjustment. Thereafter, controller 100 executes the processes of steps S2 to S9.

In step S2, controller 100 determines whether light source 11 is in a lighting state or not, and proceeds the processing to step S3 when light source 11 is in the lighting state (Yes in step S2) or to step S5 when light source 11 is not in the lighting state (No in step S2). In step S3, controller 100 refers to the light source lighting time indicating the degree of degradation of light source 11 stored in light source lighting time memory 38. In step S4, output image light intensity calculator 34 calculates the output image light intensity of the entire image light projected from projection lens 14 at intervals of a specific time period such, for example, as frame intervals of the video signal based on the light source lighting time indicating the degree of degradation of light source 11, the inputted average light source luminance, and the inputted average signal luminance. Then, controller 100 refers to the calculated output image light intensity.

In step S5, focus correction amount calculator 35 obtains the external air temperature from intake air temperature sensor 37. Next, in step S6, focus correction amount calculator 35 refers to the focus correction amount table based on the environmental temperature and the output image light intensity, calculates a focus correction target value for each of the component groups using, for example, a specified calculation formula (with, for example, different coefficients for different component groups; a table may be used in place of the calculation formula), and then calculates a focus deviation amount from a difference between the current focus correction amount and the focus correction target value for each of the component groups. Then, in step S7, focus correction amount calculator 35 adds the respective focus deviation amounts for all of the component groups to calculate a focus correction amount for the entire projection optical system 120, and outputs the obtained focus correction amount to focusing amount setting unit 47.

In step S8, focusing amount setting unit 47 corrects the focusing amount stored in focusing amount memory 46 by the focus correction amount having been calculated by focus correction amount calculator 35 to set a corrected focusing amount, and outputs the set focusing amount to focus adjusting motor driver 48. Focus adjusting motor driver 48 generates a drive signal based on the input set value of the focusing amount to drive focus adjusting motor 17.

In step S9, controller 100 determines whether to stop the focusing function or not, and returns the processing to step S2 in a case where the determination result is not to stop the focusing function (No in step S9), or, on the other hand, finishes the focus correction processing in a case where the determination result is to stop the focusing function (Yes in step S9).

In the above-described focus correction processing shown in FIG. 8, the focusing control can be performed by repeating the processes from step S3 to step S8 during when light source 11 is in the lighting state to calculate the focus correction amount according to the projecting time over which the image light has been projected. On the other hand, in a case where light source 11 is in the extinguished state, controller 100 repeats the processes from step S5 to step S8 while setting the output image light intensity to be 0%. By this processing, a sharp projected image can be obtained immediately after light source 11 is turned on again.

As described hereinabove, since a focusing control is performed for each of a plurality of component groups classified depending on the kinds of the components constructing the projection optical system, the focus deviation immediately after turning on or turning off the light source can be properly corrected so that the focus deviation is minimized. Accordingly, it is possible to correct the focus deviation in real time in response to occurrences of such changes, for example, as a turn-on of the light source and changeovers of the video signal to constantly obtain a sharp image.

Other Exemplary Embodiments

In the above description, an exemplary embodiment has been described as an example of techniques according to the present disclosure. For the purpose of the description, the accompanying drawings and the detailed description have been provided.

Accordingly, the components shown in the drawings and described in the detailed description may include not only components that are essential to solve the problems, but also components that are for exemplifying the above-described techniques and thus are not essential to solve the problems. Therefore, it should not immediately recognize that such non-essential components are essential merely since they are shown in the drawings or described in the detailed description.

Also, since the above-described exemplary embodiment is for exemplifying the techniques according to the present disclosure, various modifications, substitutions, additions, or omissions may be made within the scope of the claims and equivalents thereof.

According to the present disclosure, as described in detail hereinabove, since focusing control is performed for each of a plurality of component groups classified depending on the kinds of the components constructing the projection optical system, the focus deviation after turning on or turning off the light source can be properly corrected so that the focus deviation is minimized. Accordingly, it is possible to correct the focus deviation in real time in response to occurrences of such changes, for example, as a turn-on of the light source and changeovers of the video signal to constantly obtain a sharp image.

What is claimed is:

1. A projection display apparatus for projecting and displaying image light onto a projection plane, comprising:
   an image light generator that generates the image light by modulating light emitted from a light source according to an input image signal;
   a projection optical system including a projection lens that projects the image light onto the projection plane so that the image is magnified;
   a focus controller that controls focusing of the projection lens; and
   a temperature sensor that detects a temperature of the projection display apparatus,
   wherein the focus controller operates to:
   calculate a plurality of focus deviation amounts which correspond respectively to a plurality of component groups based on first information obtained from the image light generator and second information obtained from the temperature sensor, the plurality of component groups being classified depending on kinds of components constructing the projection optical system;
   calculate a focus correction amount according to the plurality of focus deviation amounts having been calculated; and
   control the focusing based on the focus correction amount having been calculated.

2. The projection display apparatus according to claim 1, wherein the plurality of component groups include:
   a first component group that causes a focus deviation amount to be substantially constant in a specific first time period;
   a second component group that causes a focus deviation amount to be substantially constant in a specific second time period which is longer than the first specific time period, and
   wherein the focus controller includes a storage unit that stores a focus correction amount table for calculating the focus correction amount corresponding to each of the first and second component groups in response to each of the first information and the second information and calculates the focus correction amount based on the focus correction amount table.

3. The projection display apparatus according to claim 1, wherein the first information is a light intensity of the image light obtained by correcting an ideal light intensity having been calculated from the image signal based on degradation information of the light source.

4. The projection display apparatus according to claim 1, wherein the second information is a temperature of the projection display apparatus.

5. The projection display apparatus according to claim 1, wherein the focus controller calculates the focus correction amount according to a projecting time over which the image light has been projected.

6. The projection display apparatus according to claim 1, wherein the focus controller controls the focusing at intervals of a specific time period after turning on the light source.

7. A method of controlling focusing of a projection display apparatus, the method comprising the steps of:
- obtaining first information from an image light generator that generates image light by modulating light emitted from a light source according to an input image signal;
- obtaining second information from a temperature sensor that detects a temperature of the projection display apparatus;
- calculating a plurality of focus deviation amounts which correspond respectively to a plurality of component groups based on the first information and the second information, the plurality of component groups being classified depending on kinds of components constructing a projection optical system of the projection display apparatus; and
- calculating a focus correction amount according to the plurality of focus deviation amounts having been calculated and controlling the focusing based on the focus correction amount having been calculated.

* * * * *